(12) United States Patent
Jo et al.

(10) Patent No.: US 12,449,447 B2
(45) Date of Patent: Oct. 21, 2025

(54) BATTERY FIRE PREVENTION AND DIAGNOSIS SYSTEM

(71) Applicant: HYOSUNG HEAVY INDUSTRIES CORPORATION, Seoul (KR)

(72) Inventors: Hyang Eun Jo, Tongyeong-si (KR); Hwang Dong Seo, Gimhae-si (KR); Jae Ryong Jung, Gimhae-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 449 days.

(21) Appl. No.: 18/010,519

(22) PCT Filed: Jul. 11, 2022

(86) PCT No.: PCT/KR2022/010061
§ 371 (c)(1),
(2) Date: Dec. 15, 2022

(87) PCT Pub. No.: WO2023/003244
PCT Pub. Date: Jan. 26, 2023

(65) Prior Publication Data
US 2023/0341442 A1 Oct. 26, 2023

(30) Foreign Application Priority Data
Jul. 19, 2021 (KR) .................. 10-2021-0094146

(51) Int. Cl.
*G01R 19/00* (2006.01)
*G01R 29/08* (2006.01)
(Continued)

(52) U.S. Cl.
CPC ..... *G01R 19/0053* (2013.01); *G01R 29/0807* (2013.01); *G01R 31/367* (2019.01); *G01R 31/392* (2019.01)

(58) Field of Classification Search
CPC ............ G01R 19/0053; G01R 29/0807; G01R 31/367; G01R 31/392; G01R 29/0892;
(Continued)

(56) References Cited

U.S. PATENT DOCUMENTS

| 6,451,474 B1 * | 9/2002 | Kozu | .................. H01M 50/572 |
| | | | 429/96 |
| 7,403,805 B2 * | 7/2008 | Abreu | ....................... A61P 9/00 |
| | | | 600/319 |

(Continued)

FOREIGN PATENT DOCUMENTS

| CN | 109064702 A | 12/2018 |
| KR | 10-2011-0096683 B1 | 2/2013 |

(Continued)

*Primary Examiner* — Tung S Lau
(74) *Attorney, Agent, or Firm* — NKL Law; Jae Youn Kim

(57) ABSTRACT

A battery fire prevention and diagnosis system in accordance with the present invention comprises: an ultra-high frequency (UHF) sensor for measuring radiated electromagnetic wave installed inside or outside a battery system; a data acquiring unit for receiving the radiated electromagnetic wave signals measured from the UHF sensor; noise/defect cause database including on-site noise data related to a site in operation, and data on causes of defects; and a diagnosis unit for determining abnormality of the battery system, and a cause of a defect based on the radiated electromagnetic wave signal data acquired from the data acquiring unit, and the on-site noise data and the data on causes of defects in the noise/defect cause database.

3 Claims, 2 Drawing Sheets

(51) Int. Cl.
*G01R 31/367* (2019.01)
*G01R 31/392* (2019.01)

(58) Field of Classification Search
CPC .... G01R 29/0814; G01R 31/36; G01R 23/16; G01R 29/08; G01R 29/26; G01R 31/396; Y02E 60/10
See application file for complete search history.

(56) References Cited

U.S. PATENT DOCUMENTS

| | | | |
|---|---|---|---|
| 2006/0176167 A1* | 8/2006 | Dohrmann | G08B 25/007 340/506 |
| 2012/0327745 A1 | 12/2012 | Yardibi et al. | |
| 2017/0077561 A1* | 3/2017 | Fukuda | H01M 10/482 |
| 2019/0235011 A1 | 8/2019 | Pininey et al. | |

FOREIGN PATENT DOCUMENTS

| | | |
|---|---|---|
| KR | 101235868 B1 | 2/2013 |
| KR | 10-2011-0112428 B1 | 7/2017 |
| KR | 10-2019-0073190 B1 | 5/2020 |
| KR | 10-2114225 B1 | 5/2020 |
| KR | 10-2021-0031172 A | 3/2021 |

* cited by examiner

BATTERY FIRE PREVENTION AND DIAGNOSIS SYSTEM

FIELD OF THE INVENTION

The present invention relates to a system for detecting abnormality of a battery system and preventing fire; and more particularly to, the system for detecting abnormality of the battery system and preventing fire by using an ultra-high frequency (UHF) sensor.

BACKGROUND OF THE INVENTION

The recently rapidly increasing electricity demand requires the dissemination of new and renewable energy generating systems and the development of energy storage system (ESS) by using batteries. An ESS is a large-capacity energy storage system that stores excessively generated power, and discharges it when power is insufficient. When using ESS, it is possible to reduce investment costs for new electricity generation facilities, and maximize energy production and use efficiency through linkage with new and renewable energy such as wind energy and solar energy.

Such ESS is composed of multiple batteries, a power conditioning system (PCS), etc. Herein, the PCS basically bidirectionally converts direct current (DC) power and alternating current (AC) power between a grid and a battery system, and also performs functions of improving reliability of a power grid, rapidly supplying stored energy upon peak demand for power, and so forth.

Meanwhile, as the number of installations of such ESS increases, the number of fire accidents arising from the increasing internal temperature of the ESS due to deterioration or failure of a battery system used in the ESS is gradually on the rise. Once a fire occurs, a heavy cost is required to return to the original condition, and it may give impacts even over stability of a power grid with which the ESS is connected.

Accordingly, the necessity of a measure to detect and prevent any fire before such fire occurs in an ESS is increasing.

DETAILED EXPLANATION OF THE INVENTION

Objects of the Invention

An object of the present invention is to provide a battery fire prevention and diagnosis system capable of detecting abnormality of multiple batteries earlier by using an UHF sensor.

The other object of the present invention is to provide the battery fire prevention and diagnosis system capable of preventing fire accidents due to any defective battery because it detects the abnormality of multiple batteries with the use of the UHF sensor.

Means of Solving the Problem

A battery fire prevention and diagnosis system in accordance with the present invention comprises: an ultra-high frequency (UHF) sensor for measuring radiated electromagnetic wave installed inside or outside a battery system; a data acquiring unit for receiving the radiated electromagnetic wave signals measured from the UHF sensor; noise/defect cause database including on-site noise data related to a site in operation, and data on causes of defects; and a diagnosis unit for determining abnormality of the battery system, and a cause of a defect based on the radiated electromagnetic wave signal data acquired from the data acquiring unit, and the on-site noise data and the data on causes of defects in the noise/defect cause database.

At the time, the battery system may mean a battery rack comprised of a multiplicity of battery modules, each of which consists of multiple battery cells.

Herein, the diagnosis unit may remove noise by comparing the radiated electromagnetic wave signal data with the on-site noise data.

In addition, after the noise is removed, the diagnosis unit may draw at least one of pulse size, wave, and frequency through signal analysis, and determine abnormality and any cause of a defect by comparing it with the data on causes of defects.

Meanwhile, the on-site noise data in the noise/defect cause database may be constructed by measuring on-site noise at a site currently in operation, and the data on causes of defects may be acquired in a way of simulating random battery defects, checking internal abnormal conditions, and constructing such causes of defects.

At the time, the UHF sensor may be installed inside or outside the battery rack or in the battery module.

Meanwhile, the battery system may be equipped in an ESS.

Effects of the Invention

A battery fire prevention and diagnosis system in accordance with the present invention has an effect of being capable of detecting any abnormality of multiple batteries earlier by using an UHF sensor.

Besides, the battery fire prevention and diagnosis system in accordance with the present invention has an effect of being capable of preventing any fire accident caused by battery defects because it is possible to detect any abnormality of multiple batteries earlier by using the UHF sensor.

DETAILED DESCRIPTION OF THE PREFERRED EMBODIMENTS

Figure 1:
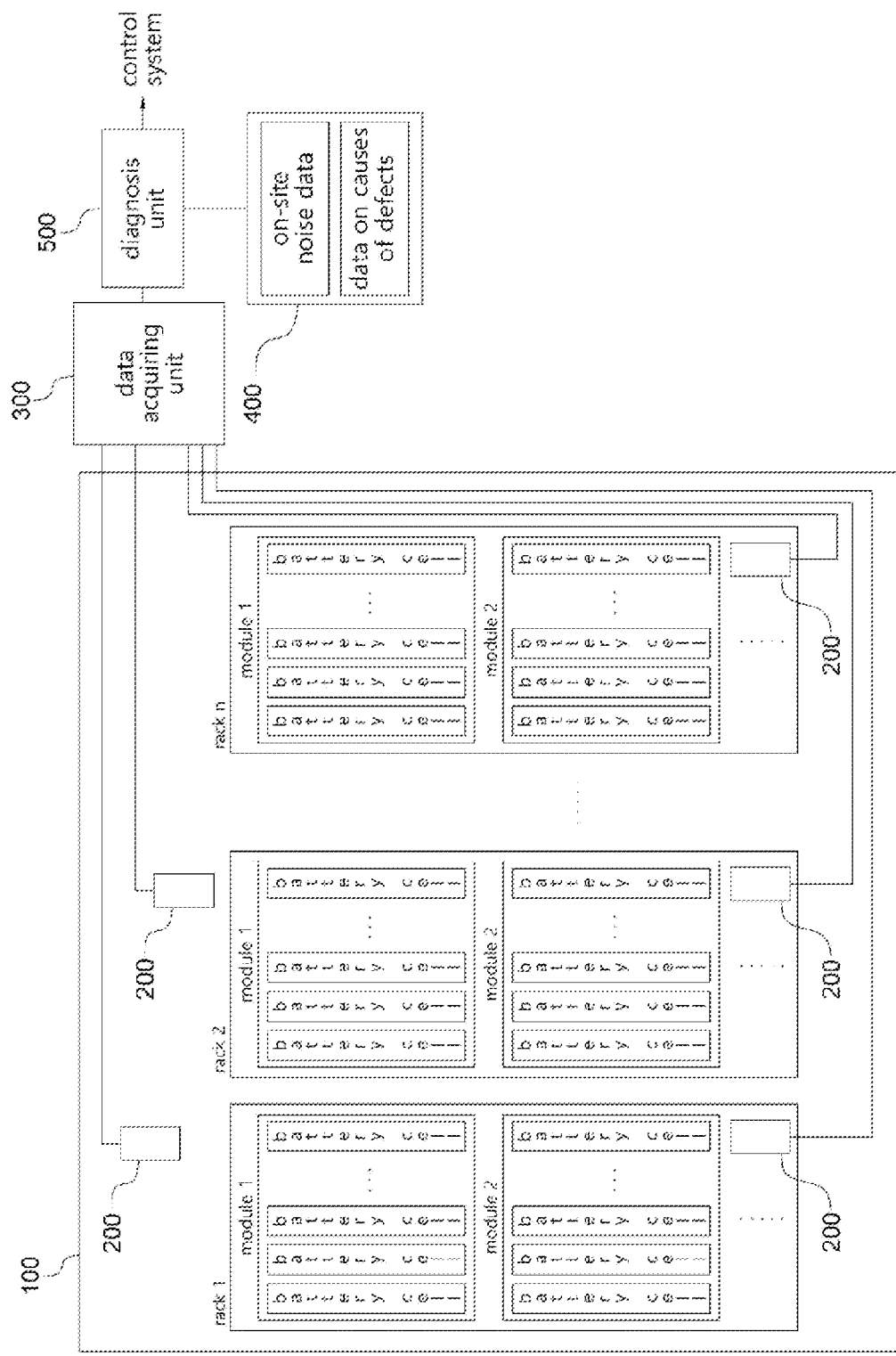
FIG. 1 is a block diagram illustrating a battery fire prevention and diagnosis system in accordance with an example embodiment of the present invention.

Detailed example embodiments to implement the present invention will be explained below by referring to attached drawings.

Since the present invention may make a variety of modifications, and have several example embodiments, specific example embodiments will be illustrated in diagrams, and explained in details. This is not intended to limit specific embodiments which specify the present invention, and it may be understood to include all modifications, equivalents, or substitutes included in the thought and technical scope of the present invention.

Detailed explanation will be made on a battery fire prevention and diagnosis system in accordance with the present invention by referring to the attached drawings.

First, causes of fire of an ESS and a process of fire occurrence will be explained.

Causes of fire of an ESS may be largely classified into the following types: defects in battery systems, lack of protection systems against electric shock, lack of management of an operating environment, careless installation, negligence in installation and operation management, etc.

Defects in battery systems may include continuous electric shock such as short circuit and ground fault, non-operation of a self-protection function of such battery systems, etc., while cases regarding lack of protection systems against electric shock may include external short circuit such as IGBT short circuit of a PCS, battery overdischarge, and overpotential, etc.

In addition, cases regarding lack of management of an operating environment and careless installations may include additional charging after a battery system is fully charged, increase in battery cell voltage, application of negative overpotential, etc.

Negligence in installation and operation management may include battery cell shock, wrong wiring, reduction in insulation resistance, etc.

When the operating period of the ESS is longer due to the aforementioned causes, defects of battery cells are accumulated in a battery system equipped in the ESS, and this causes a cell-swelling phenomenon, i.e., a battery swelling phenomenon.

At this state, deformation of battery stacks and partial rupture of a separator in a battery system occur, and fine short circuits occur inside battery cells, and these cause discharge inside the batteries.

Discharge inside batteries occurs due to partial rupture of insulation between electrodes or a separator, or fine short circuits inside battery cells with high frequency currents, electromagnetic waves, light, sound, gas, heat, etc.

After that, when battery deterioration continues, a phenomenon of deforming and degassing battery cells occurs, and upon occurrence of any abnormal battery system by installing systems for protecting such phenomenon, power, now, is shut down, or emitted gases are discharged through vent holes by installing vents.

However, even after the operation of such protective systems and vents, when such defect continuously develops, the battery cell is deformed due to resistance, and voltage of another cell is applied to the deformed battery cell. Finally, internal short circuits due to resistance heat continue, and lead occurrence of fire due to thermal runway.

Meanwhile, during each stage of ESS fire development as shown above, internal discharge in the battery system continues. At the early stage, it occurs intermittently, but when such defect gradually develops, discharge cycles increase.

To effectively prevent fire of ESS in advance, it is necessary to detect internal abnormalities in batteries during the early or pre-step of "deformation of battery stacks, partial rupture of separators, and fire short circuits in battery cells" in a fire mechanism other than electrical safety measures and fire safety measures such as supervision, protection, and extinguishment. In other words, the fire mechanism for ESS proceeds in five steps (defect in a battery cell→cell swelling→a preventive system's operation→opening vent holes→fire), and factors possible to measure upon fire occurrence include internal discharge of the battery system, temperature, and off gas.

Among them, in case of internal discharge, high-frequent current is detected at each step, and in case of temperature, if there occurs any abnormality such as overcharge in the battery system, after the battery cell is swollen, a protective system operates without any rise in temperature, and therefore, it is not appropriate as factor for fire prevention. In addition, an off-gas monitoring system, which detects emitted gas due to any defect in a battery system, is difficult to be applied for fire prevention because it operates only when vent holes are opened.

Accordingly, the present invention is intended to measure internal discharge in a battery system through a UHF sensor that does not give any physical deformation and operating environment of the battery system itself, and to prevent fire in advance by detecting an internal discharge signal in a battery cell "before a protective system operates after the cell is swollen" during the process of fire of ESS.

The present invention is explained in detail by referring to attached drawings.

FIG. 1 is a block diagram illustrating a battery fire prevention and diagnosis system in accordance with an example embodiment of the present invention.

By referring to FIG. 1, the battery fire prevention and diagnosis system in accordance with one example embodiment of the present invention comprises: an UHF sensor 200 for measuring radiated electromagnetic wave installed inside or outside a battery system 100; a data acquiring unit 300 for receiving the radiated electromagnetic wave signals measured from the UHF sensor 200; noise/defect cause database 400 including on-site noise data related to a site in operation, and data on causes of defects; and a diagnosis unit 500 for determining abnormality of the battery system, and a cause of a defect based on the radiated electromagnetic wave signal data acquired from the data acquiring unit 300, and the on-site noise data and the data on causes of defects in the noise/defect cause database 400.

Herein, the battery system 100 includes multiple battery cells. When this is explained in detail, a battery cell means one battery. A battery module is composed of such battery cells, and a battery rack is composed of a multiplicity of battery modules.

As seen in FIG. 1, the present invention has an effect of being capable of measuring multiple battery cells at the same time by installing the UHF sensor 200 inside or outside a battery rack or in a battery module.

FIG. 1 illustrates a battery rack equipped with a multiplicity of battery modules composed of multiple battery cells as one example embodiment of the battery system 100, but this is one example embodiment. According to examples, and depending on necessity, a variety of modifications of number of battery cells or battery modules may be applied.

The UHF sensor 200 is a sensor that measures radiated electromagnetic wave by internal discharge in the battery system upon partial rupture of a separator in the battery system, or fine short circuit in a battery cell.

When the UHF sensor 200 is used, a discharge phenomenon due to any internal defect in the battery system may be measured, and this may lead a degree of deterioration to be effectively diagnosed. In particular, the UHF sensor 200 is less sensitive than a high frequency current transformer (HFCT), but it is less affected by noise, and measures only defect signals. Therefore, if the UHF sensor measures a signal, it is highly reliable enough to consider the signal as a real defect signal.

In accordance with the present invention, the on-site noise data in the noise/defect cause database 400 may be constructed by measuring on-site noise at a site currently in operation, and the data on causes of defects is acquired in a way of constructing causes of defects by simulating random battery defects, and checking internal abnormal conditions and so forth.

Meanwhile, the diagnosis unit 500 diagnoses abnormality of the battery system 100, and a cause of a defect based on the radiated electromagnetic wave signal data acquired from the data acquiring unit 300, and the on-site noise data and the data on causes of defects in the noise/defect cause database 400, and transmits the result to a higher-ranked control system.

For this, the diagnosis unit 500 removes noise by comparing the radiated electromagnetic wave signal data and the on-site noise data stored in the noise/defect cause database 400. After that, the diagnosis unit 500 analyzes pulse size, wave, and frequency through signal analysis, and determines abnormality and any cause of a defect by comparing them with the data on causes of defects stored in the noise/defect cause database 400.

In accordance with the example embodiment, it is possible to simulate random battery defects and check internal abnormal conditions to obtain data on causes of defects in the noise/defect cause database 400 in a way of simulating battery cell swelling caused by overheating and overcharging due to internal defect, and measuring and analyzing internal discharging signals before the operation of a protective system.

Figure 2:
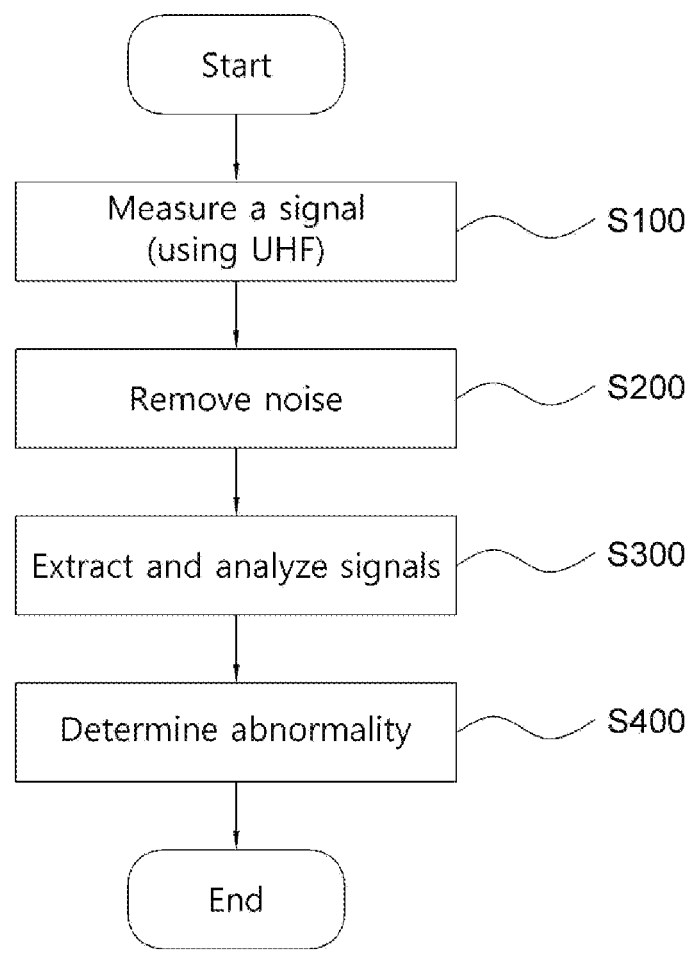
FIG. 2 is a workflow diagram of a battery fire prevention and diagnosis system in accordance with an example embodiment of the present invention.

Next, the operation of the battery fire prevention and diagnosis system in accordance with the present invention is explained by referring to FIG. 2. FIG. 2 is a workflow diagram of a battery fire prevention and diagnosis system in accordance with an example embodiment of the present invention.

In accordance with the present invention, the battery fire prevention and diagnosis system first measures radiated electromagnetic wave signals of the battery system 100 through a UHF sensor 200 at S100. In the present invention, the UHF sensor 200 for a battery rack may be installed inside or outside a battery rack or in a battery module so that it is possible to measure from multiple battery cells at the same time.

After that, noise is removed by comparing the radiated electromagnetic wave signals with on-site noise data stored in noise/defect cause database 400 at S200. Herein, on-site noise data is constructed by measuring on-site noise at a site currently in operation.

As explained above, the UHF sensor 200 is less sensitive than a high frequency current transformer (HFCT), but it is less affected by noise, and measures only defect signals. Therefore, if the UHF sensor measures a signal, it is highly reliable enough to consider the signal as a real defect signal.

In addition, signals are extracted and analyzed to draw pulse size, wave, and frequency, etc. at S300.

The drawn pulse size, wave, and frequency, etc. are compared with the data on causes of defects stored in the noise/defect cause database 400 to determine abnormality and any cause of a defect at S400.

Herein, the data on causes of defects is constructed by simulating random battery defects, and checking internal abnormal conditions. Depending on example embodiments, it may be acquired in a way of simulating battery cell swelling by heating and overcharging due to internal defect, etc. and measuring and analyzing internal discharging signals before the operation of a protective system.

As explained above, because the present invention installs and uses the UHF sensor 200 inside or outside the battery rack or inside the battery module, it is possible to measure from multiple battery cells at the same time.

Explanation has been made with an example of the battery system equipped with the ESS in the example embodiment of the present invention, but the present invention is not limited to this, and it could be applied to any apparatus or equipment that has a battery system including multiple battery cells.

As seen above, the battery fire prevention and diagnosis system in accordance with the present invention may detect abnormality of multiple batteries earlier by using the UHF sensor, and prevent any fire accident caused by any battery defect.

What has been explained above includes one or more example embodiments. Of course, for the purpose of explaining the aforementioned example embodiments, it can be recognized that not all possible combinations of components or methods could be described but a lot of additional combinations and replacements in a variety of example embodiments can be made by those of ordinary skill in the art. Accordingly, the explained example embodiments could include all alternatives, modifications, and adaptations falling within the spirit and scope of what is claimed attached could be included.

INDUSTRIAL AVAILABILITY

The present invention relates to a system for preventing fire by detecting abnormality of a battery system, and it is available in ESS including batteries.

What is claimed is:

1. A battery fire prevention and diagnosis system for a battery system including one or more modules, each of the one or more modules having one or more battery cells, comprising:
    a frequency sensor configured to measure a radiated electromagnetic wave signal and an internal discharge of the one or more cells;
    a data acquiring unit configured to receive the radiated electromagnetic wave signal measured from the frequency sensor;
    a noise/defect cause database including:
        on-site noise data constructed by measuring noise at a site currently in operation, and
        defect cause data obtained by simulating battery cell swelling caused by overheating or overcharging due to internal defects of the battery system, wherein the defect cause data includes an internal discharge signal of the one or more battery cells occurring before a protective system operates following the swelling of the one or more battery cell; and
    a diagnosis unit configured to:
        remove the noise from the radiated electromagnetic wave signal after comparing the radiated electromagnetic wave signal with the on-site noise data;
        extract at least one of a pulse size, a wave, and a frequency or any combination thereof from the noise removed radiated electromagnetic wave signal; and
        determine an abnormality of the battery system and a cause of one or more of the internal defects thereof based on the radiated electromagnetic wave signal acquired from the data acquiring unit and the noise/defect cause database including the on-site noise data and the defect cause data,
    wherein the battery system is equipped in an energy storage system (ESS).

2. The system of claim 1, wherein the battery system comprises a battery rack including the one or more battery modules.

3. The system of claim 1, wherein the frequency sensor is installed inside or outside the battery rack or in the one or more battery modules.

\* \* \* \* \*